(12) United States Patent
Uchino et al.

(10) Patent No.: US 7,095,160 B2
(45) Date of Patent: Aug. 22, 2006

(54) PIEZOELECTRIC MOTOR AND METHOD OF EXCITING AN ULTRASONIC TRAVELING WAVE TO DRIVE THE MOTOR

(75) Inventors: Kenji Uchino, State College, PA (US); Shuxiang Dong, Blacksburg, VA (US); Michael T. Strauss, Newburyport, MA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 10/855,260

(22) Filed: May 26, 2004

(65) Prior Publication Data

US 2005/0001516 A1 Jan. 6, 2005

Related U.S. Application Data

(60) Provisional application No. 60/473,430, filed on May 27, 2003.

(51) Int. Cl.
*H01L 41/04* (2006.01)
*H02N 2/10* (2006.01)
*H02N 2/12* (2006.01)

(52) U.S. Cl. ............ 310/333; 310/323.03; 310/323.04; 310/364; 310/365

(58) Field of Classification Search ............................... 310/323.03–323.04, 333, 365, 323.02
See application file for complete search history.

(56) References Cited

U.S. PATENT DOCUMENTS

| | | | | |
|---|---|---|---|---|
| 4,622,483 | A | | 11/1986 | Staufenberg, Jr. et al. .. 310/328 |
| 4,912,351 | A | * | 3/1990 | Takata et al. .......... 310/323.16 |
| 4,945,275 | A | * | 7/1990 | Honda .................... 310/323.02 |
| 6,242,849 | B1 | * | 6/2001 | Burov et al. ................. 310/328 |
| 6,288,475 | B1 | * | 9/2001 | Ito et al. ................. 310/323.01 |
| 6,518,689 | B1 | * | 2/2003 | Yerganian ............... 310/323.06 |

OTHER PUBLICATIONS

Shuxiang*, H. W. Kim, M. T. Strauss #, K. Uchino and D. Viehiand, "A Piezoelectric Shear-Shear Mode Ultrasonic Motor", ICAT/Materials Research Institute, The Pennsylvania State University, University Park, PA 16801 USA, Apr. 2004; *Materials Science & Engineering, Virginia Tech, Blacksburg, VA 24061, USA; #HME, 56 Federal Street, Newbury port, MA 01950, USA.

* cited by examiner

*Primary Examiner*—Darren Schuberg
*Assistant Examiner*—J. Aguirrechea
(74) *Attorney, Agent, or Firm*—Gifford, Krass, Groh, Sprinkle, Anderson & Citkowski, PC

(57) ABSTRACT

A rotary ultrasonic piezoelectric motor is provided and a method of exciting a flexure traveling wave to drive the motor. The motor includes a stator having a piezoelectric ceramic disc polarized in the radial direction and bounded by a top electrode and a segmented bottom electrode. The motor also includes a power source for applying two pairs of alternating voltages to the bottom electrode segments to excite a shear-shear mode vibration in the stator, resulting in a shear-shear mode flexure traveling wave in the stator. The motor further includes a rotor operatively connected to the stator, and the stator is driven to rotate through a frictional force between the rotor and the stator due to the traveling wave deformation of the stator. A linear ultrasonic piezoelectric motor and method of exciting a flexure traveling wave to linearly drive the motor is provided. The motor includes a stator having a rectangular piezoelectric ceramic plate that is polarized in the longitudinal direction. The motor also includes a power source for applying two pairs of alternating voltages to the bottom electrode segments to excite a shear-shear mode vibration in the stator, resulting in a shear-shear mode flexure traveling wave in the stator. The motor further includes a slider operatively connected to the stator, and the stator is driven to move linearly through a frictional force between the slider and the stator due to the traveling wave deformation of the stator.

18 Claims, 8 Drawing Sheets

| DIELECTRIC CONSTANT $\varepsilon^T_{33}/E_0$ | DISSIPATION FACTOR TAN $\delta$ (%) | COUPLING COEFFICIENT | | | PIEZOELECTRIC COEFFICIENT ($10^{-12}$C/N) | | | MECHANICAL QUALITY FACTOR $Q_m$ |
|---|---|---|---|---|---|---|---|---|
| | | $k_{31}$ | $k_{33}$ | $k_{15}$ | $d_{31}$ | $d_{33}$ | $d_{15}$ | |
| 1350 | 0.35 | 0.33 | 0.68 | 0.67 | 109 | 275 | 450 | 1400 |

FIG - 2

| FLEXURE RESONANACE MODE | $B_{02}$ | $B_{03}$ | $B_{04}$ | $B_{05}$ | $B_{11}$ | $B_{12}$ | $B_{13}$ | $B_{14}$ |
|---|---|---|---|---|---|---|---|---|
| RESONANCE FREQUENCY CONSTANT | 2.348 | 3.570 | 4.724 | 5.845 | 4.518 | 5.940 | 7.729 | 8.592 |

FIG - 3

| RESONANCE FREQUENCY, kHz | 120.54 | 135.38 | 163.18 | 507.07 | 980.02 |
|---|---|---|---|---|---|
| MODE | LONGITUDINAL | TWIST | FLEXURE | THICKNESS SHEAR | SHEAR |
*FIG-8*
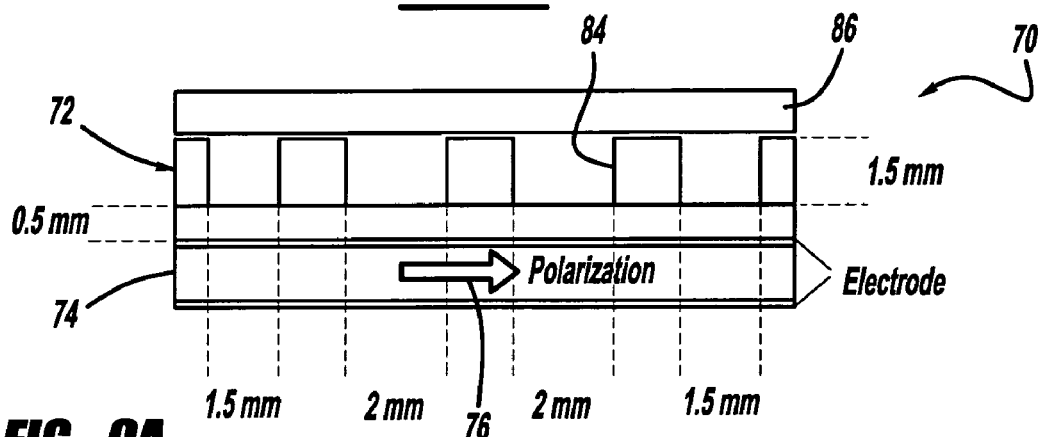
*FIG-9A*
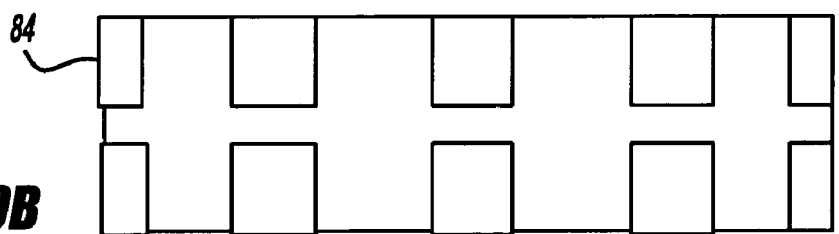
*FIG-9B*
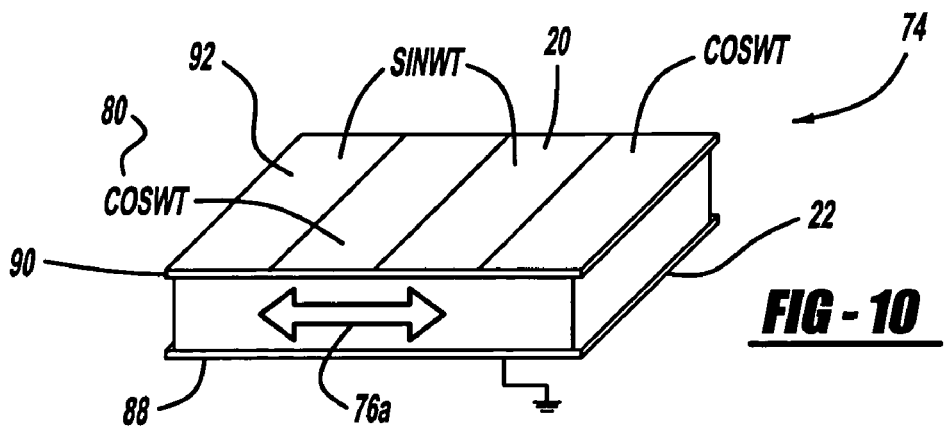
*FIG-10*

PIEZOELECTRIC MOTOR AND METHOD OF EXCITING AN ULTRASONIC TRAVELING WAVE TO DRIVE THE MOTOR

This application claims priority to U.S. provisional patent application Ser. No. 60/473,430, filed May 27, 2003, and which is incorporated herein, by reference, in its entirety.

BACKGROUND OF THE INVENTION

1. Field of the Invention

The present invention relates generally to a miniature piezoelectric motor, and in particular to a rotary piezoelectric motor and a linear piezoelectric motor and method of exciting an ultrasonic traveling wave for driving the motor.

2. Description of the Related Art

Piezoelectric ultrasonic motors with their exceptional properties, such as high resolution of displacement control, absence of parasitic magnetic fields, frictional locking at the power-off stage, and high thrust to weight ratio, make them good candidates for use in precision micromechanical systems.

Piezoelectric motors have several advantages over a conventional electromagnetic motor. These include a faster response time, a high power-to-weight ratio, and smaller packaging capability. They also have several disadvantages, including the need for high voltage, high frequency power sources, and potential wear at the rotor/stator interface. These motors operate using a ferroelectric ceramic element to excite ultrasonic vibrations in a stator structure. The elliptical movement of the stator is converted into the motion of a sliding plate in frictional contact with the stator. The resulting movement is either rotational or linear, depending on the design of the structure.

Conventional piezoelectric ultrasonic motors can be mainly classified into two classes: 1) traveling wave ultrasonic motors, and 2) standing wave ultrasonic motors. A conventional disc-type or ring-type traveling wave motor (rotary motor) is made from a piezoelectric disc (or ring) and a metal disc. With a piezoelectric $d_{31}$ effect, the piezoelectric disc (or ring) and metal disc composite stator produces a flexure-flexure mode traveling wave that drives a contact rotor through a frictional force. The most frequently researched operating principle for a linear piezoelectric motor is based on the excitation of a longitudinal and a superimposed bending mode of a rectangular piezoelectric plate, to achieve the elliptic motion of the driving tip.

A disc-type traveling wave rotary motor, such as that developed by Matsushita Electric Company Ltd., is representative of a traveling wave type of motor. The piezoelectric stator for this type of motor includes a composite disc comprised of a metal elastic disc and two piezoelectric ceramic discs with thickness polarization. A traveling flexure vibration mode is excited by each section of the piezoelectric discs, and produces a transverse width extension mode with $d_{31}$ effect under two ac voltages.

Another typical configuration for the conventional traveling wave ultrasonic rotary piezoelectric motor is a ring-type ultrasonic motor, such as that developed by Sashida. This motor utilizes the axial bending-vibration mode of a circular ring with $d_{31}$ effect of the piezoelectric ceramic ring. The piezoelectric ring-type element is polarized in the thickness direction and produces a transverse length extension mode with $d_{31}$ effect under ac voltages.

A typical configuration of the conventional linear ultrasonic motor, such as that developed by Yoshiro Tomikawa, is driven by the elliptic motion of the combination displacement of longitudinal ($d_{31}$) and secondary bending modes. The motor operates according to the principle that at a certain distance to length ratio of a rectangular-shaped piezoelectric ceramic plate, the resonant frequencies of first longitudinal and second bending modes coincide with each other. The elliptic motion is obtained by the combination of the two vibrations.

While all the above described rotary and linear motors offer satisfactory performance, they primarily utilize a transverse length extension mode for exciting a traveling flexure wave with a low $d_{31}$ piezoelectric effect and low $k_{31}$ electromechanical coupling effect. In the operational mode, the relatively low $d_{31}$ and $k_{31}$ effects of the piezoelectric ceramic material hinders additional development of these types of motors.

Thus, there is a need in the art for a system and method of providing a rotary motor which utilizes a rotary shear vibration mode and a linear ultrasonic motor which uses the linear shear vibration mode, respectively, of piezoelectric ceramics.

SUMMARY OF THE INVENTION

Accordingly, the present invention is a piezoelectric motor and a method of exciting an ultrasonic traveling wave for driving the motor. A rotary shear motor includes a stator having a piezoelectric ceramic disc polarized in the radial direction and bounded by a top electrode and a bottom electrode divided into segments. The rotary motor also includes a power source for applying two pairs of alternating voltages to the bottom electrode segments to excite a shear-shear mode vibration in the stator, resulting in a shear-shear mode flexure traveling wave in the stator. The rotary motor further includes a rotor operatively connected to the stator, and the portion of the rotor in contact with the stator is driven to rotate through a frictional force between the rotor and the stator due to the traveling wave deformation of the stator.

A linear ultrasonic piezoelectric motor includes a stator having a rectangular piezoelectric ceramic plate that is polarized in the longitudinal direction. The linear motor also includes a power source for applying two pairs of alternating voltages to the bottom electrode segments to excite a shear-shear mode vibration in the stator, resulting in a shear-shear mode flexure traveling wave in the stator along the longitudinal direction of the stator. The linear motor further includes a slider operatively connected to the stator, and the portion of the slider in contact with the stator is driven to move linearly through a frictional force between the slider and the stator due to the traveling wave deformation of the stator.

The method of exciting a shear-shear mode vibration in a piezoelectric ceramic disc for a rotary ultrasonic piezoelectric motor includes the steps of polarizing the piezoelectric disc in a radial direction, applying a pair of alternating voltages with a phase shift of 90 degrees to the bottom electrode segments from a power source, exciting a shear-shear mode vibration in the stator, and producing a shear-shear mode flexure traveling wave in the stator causing a portion of the rotor in contact with the stator to rotate through a frictional force between the rotor and the stator due to the traveling wave deformation of the stator.

The method of exciting a shear-shear mode vibration in a piezoelectric ceramic plate for a linear ultrasonic piezoelectric motor includes the steps of polarizing the piezoelectric plate in a longitudinal direction, applying a pair of alternating voltages with a phase shift of 90 degrees to the bottom electrode segments from a power source, exciting a shear-shear mode vibration in the stator, and producing a shear-shear mode flexure traveling wave in the stator causing a portion of the slider in contact with the stator to move linearly through a frictional force between the slider and the stator due to the traveling wave deformation of the stator.

One advantage of the present invention is that a piezoelectric motor and method of exciting an ultrasonic traveling wave for driving the motor is provided. Another advantage of the present invention is that a system and method of exciting an ultrasonic traveling wave using a shear mode for driving the motor is provided that is reduced in size, but operates with increased efficiency because $d_{15}$ and $k_{15}$ effects are larger than $d_{31}$ and $k_{31}$ effects, respectively, in the PZT piezoelectrics. Still another advantage of the present invention is that a piezoelectric motor and method of exciting an ultrasonic traveling wave using a shear mode for driving the motor is provided that realizes increased mechanical energy output due to a higher $k_{15}$ effect. A further advantage of the present invention is that the electrical to mechanical conversion rate is increased, so that the motor can be miniaturized. Still a further advantage of the present invention is that the piezoelectric ceramic disc is polarized using a shear-shear flexure motion mode to produce a rotary motion of the rotor. Still yet a further advantage of the present invention is that the piezoelectric ceramic rectangular plate is polarized using a linear shear-shear flexure motion mode to produce a linear motion of the slider.

Other features and advantages of the present invention will be readily appreciated, as the same becomes better understood after reading the subsequent description taken in conjunction with the accompanying drawings.

BRIEF DESCRIPTION OF THE DRAWINGS

FIG. 2 is a table illustrating the properties of a hard-type piezoelectric ceramic material for the motor of FIG. 1a, according to the present invention.

FIG. 3 is a table illustrating an example of a resonance frequency constant for the motor of FIG. 1a, according to the present invention.

FIG. 8 is a table illustrating an example of a resonance frequency constant for the motor of FIG. 9(a), according to the present invention.

FIG. 9(a) illustrates another embodiment of a linear shear-shear mode piezoelectric linear motor, according to the present invention.

FIG. 9(b) is a top view illustrating the tooth structure for the shear-shear mode piezoelectric linear stator of FIG. 9(a), according to the present invention.

FIG. 10 is a perspective view illustrating a rectangular piezoelectric ceramic plate for the motor of FIG. 9(a), according to the present invention.

DESCRIPTION OF THE PREFERRED EMBODIMENT(S)

Referring to FIGS. 1–7 a shear-shear piezoelectric motor 10 is illustrated. The piezoelectric ceramic disc described in the present invention is especially advantageous in enhancing the performance of an ultrasonic piezoelectric ceramic motor. In particular, the vibration mode selected for the piezoelectric stator has a piezoelectric effect and electromechanical coupling effect that is higher than those used in conventional rotary or linear ultrasonic motors using a comparable piezoelectric ceramic material.

Figure 1A:
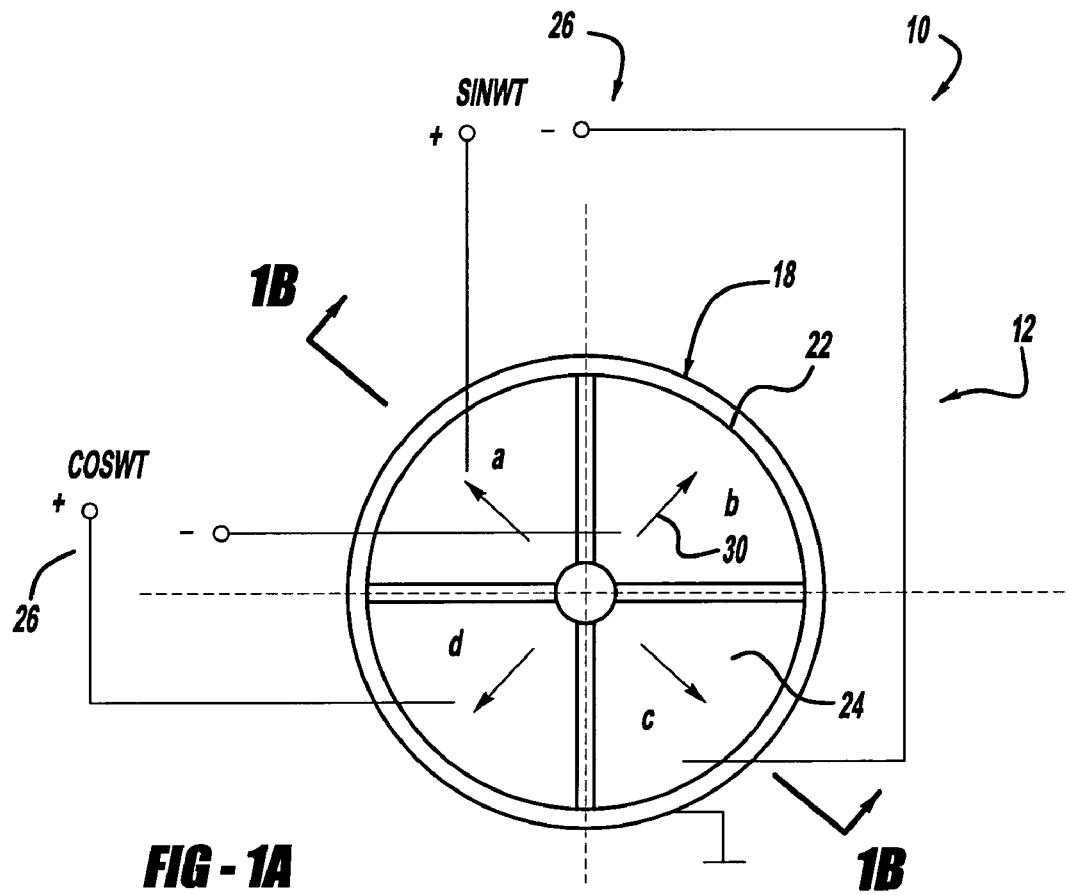
FIG. 1a is a bottom view of a piezoelectric ceramic disc with radial polarization direction for a rotary piezoelectric motor, according to the present invention.
Figure 1B:
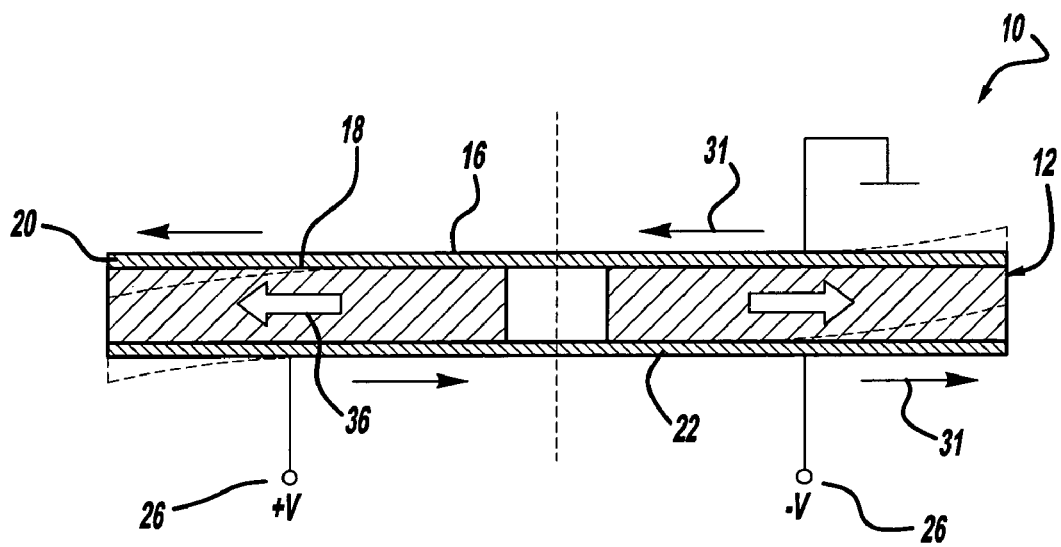
FIG. 1b is a cross-sectional view taken along line a—a through the piezoelectric ceramic disc of FIG. 1a, according to the present invention.

Referring to FIGS. 1a and 1b, the shear-shear piezoelectric motor 10 includes a traveling wave composite stator 12. The stator 12 includes a body portion (not shown) for housing a piezoelectric ceramic disc 16, which in this embodiment is polarized in the radial direction, as shown at 30. It should be appreciated that the piezoelectric disc 16 for the shear-shear motor 10 may be made from a hard-type piezoelectric ceramic. A typical piezoelectric ceramic material for such high power applications is a hard-type material, such as PZT8. An example of such a material is APC841 from APC Company.

FIG. 2 is a table listing parameters for the ceramic disc 16, such as the electromechanical coupling coefficients, piezoelectric constants and other parameters for a hard-type piezoelectric ceramic material, as shown at 28. For example, a piezoelectric ceramic disc 16 may have properties of high $d_{15}$ performance, piezoelectric coefficient, high electromechanical coupling coefficient and high quality factor. In this example, a piezoelectric disc-type stator 12 having an outer diameter of 10.5 mm, and inner diameter of 1.8 mm and thickness of 0.5 mm, was operated in the $B_{02}$ mode with the resonance frequency of about 39 kHz. Under 70 Vrms/10 mA, the motor speed was about 200 rpm with the maximum torque around 1.8 mNm. It should be appreciated that the torque obtained with this motor 10 is larger than 0.7 mNm torque obtained from a conventional unimorph-type motor with a similar configuration.

The piezoelectric disc 16 is bounded by at least one metal plate 18 in order to excite a flexure mode of the composite stator 12. The plate 18 includes a top electrode 20 and a bottom electrode 22. The bottom electrode 22 is divided into four segments 24, labeled a, b, c and d, as shown in FIG. 1b. Two pairs of alternative voltages 26, $V_0 \sin \omega t$ and $V_0 \cos \omega t$, are each applied to parts a, c and b, d, respectively. The number of electrode segments can be chosen any even number (2, 4, 6, 8, . . . ). Preferably the top electrode 20 of the ceramic disc 16 is not divided into parts, in order to provide a ground.

As shown in FIG. 2 at 28, the piezoelectric ceramic material's $d_{15}$ and $k_{15}$ effects are about 4 times and 2 times higher than the corresponding $d_{31}$ and $k_{31}$ effects. It should be appreciated that by using the $d_{15}$ and $k_{15}$ effect from a shear mode to excite a flexure mode or traveling wave in a disc or ring-type piezoelectric stator, an ultrasonic motor with higher electromechanical coupling effect can be obtained. It should also be appreciated that although the piezoelectric constant $d_{33}$ and coupling coefficient $k_{33}$ also are higher than the piezoelectric constant $d_{31}$ and coupling effect $k_{31}$, it is difficult to excite a flexure traveling wave using the $d_{33}$ effect for a disc or rectangular type miniaturized motor.

Referring back to FIG. 1b, the shear-shear mode is illustrated for the piezoelectric ceramic disc shown in FIG. 1a. Since the applied electric field is vertical to the polarization direction as shown at 30, the applied voltages 26 $V_0 \sin \omega t$ and $V_0 \cos \omega t$ will induce the piezoelectric disc to produce a shear mode vibration of the stator. As a result of the shear mode concurrent vibration and rotation, a shear-shear flexure traveling wave is excited on the stator 12, as shown at 31. It should be appreciated that a method of exciting a flexure traveling wave in the proposed motor (to be described) is distinguishable from that of a conventional piezoelectric disc/ring having a metal elastic plate composite rotor. The present invention advantageously utilizes two shear strain modes ($d_{15}$ effect) with reverse strain direction of the piezoelectric ceramic for exciting a flexure traveling wave on the stator 12. This is distinguishable from a prior art piezoelectric disc/ring composite stator which utilizes a transverse width or length extension mode of the piezoelectric disc under an applied ac voltage.

The piezoelectric ceramic disc stator has a flexure vibration mode related to its operational frequency. For example, if the elastic composite disc 16 is operated at a bending mode $B_{m,n}$, its resonance frequency at the free-free boundary condition can be given by the equation:

$$f_r = \frac{1}{2\pi} \frac{\alpha_{mn}^2}{a^2} h \sqrt{\frac{E}{3\rho(1-\sigma^2)}} \quad (1)$$

where $\alpha_{mn}$ is a resonance frequency constant and a, 2h are the radius and thickness of the disc vibrator, respectively; E, $\rho$ and $\sigma$ are Young's modulus, mass density and Poisson ratio, respectively.

FIG. 3 is a table illustrating an example of a resonance frequency constant $\alpha_{mn}$ for different flexure resonance modes $B_{mn}$, as shown at 32. It should be appreciated that these types of frequency constants can be utilized to calculate the resonance frequency for each mode.

Figure 4:
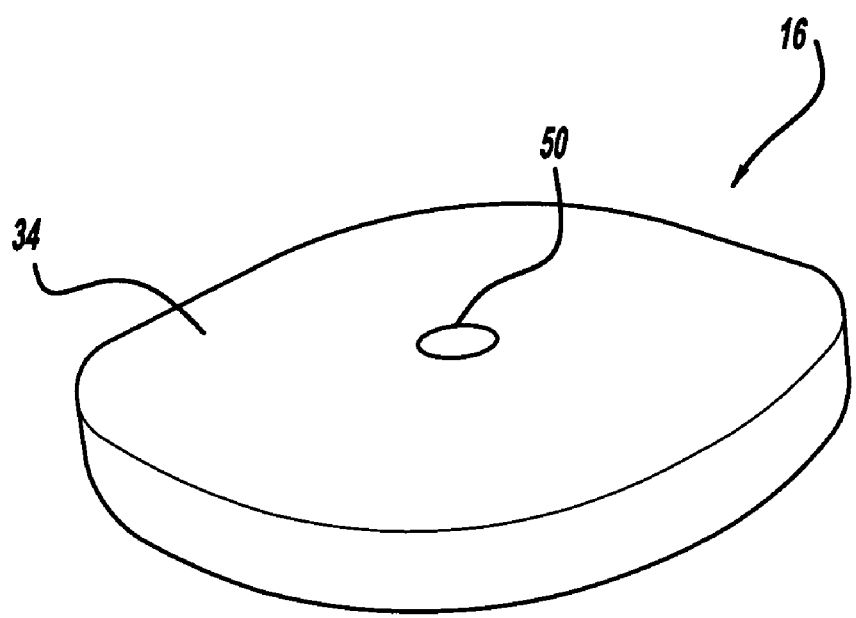
FIG. 4 is a perspective view of a piezoelectric ceramic disc with a $B_{02}$ mode traveling flexure wave produced by the shear-shear vibration mode of the piezoelectric ceramic disc under two phase voltages and free boundary condition with phase difference of $\pi/2$, according to the present invention.

Referring to FIG. 4, an example of a ceramic disc 16 with traveling flexure wave as shown at 34 is illustrated for the $B_{02}$ mode produced by shear-shear mode of the piezoelectric ceramic disc under two phase voltages with phase difference of $\pi/2$. It should be appreciated that the ceramic disc with the traveling flexure wave may be modeled using an analytical technique, such as a finite element analysis (FEA). For example, an FEA program, such as Analysis of Transducers by Integration of LaPlace Equations (ATILA) may be used to predict the operation of the stator 12 structure. Using FEA, ATILA provides both the resonance frequencies of the stator structure and simulations of its motion modes. Moreover, using FEA modeling, some useful rotational modes for exiting flexural traveling modes may be discovered.

Figure 5:
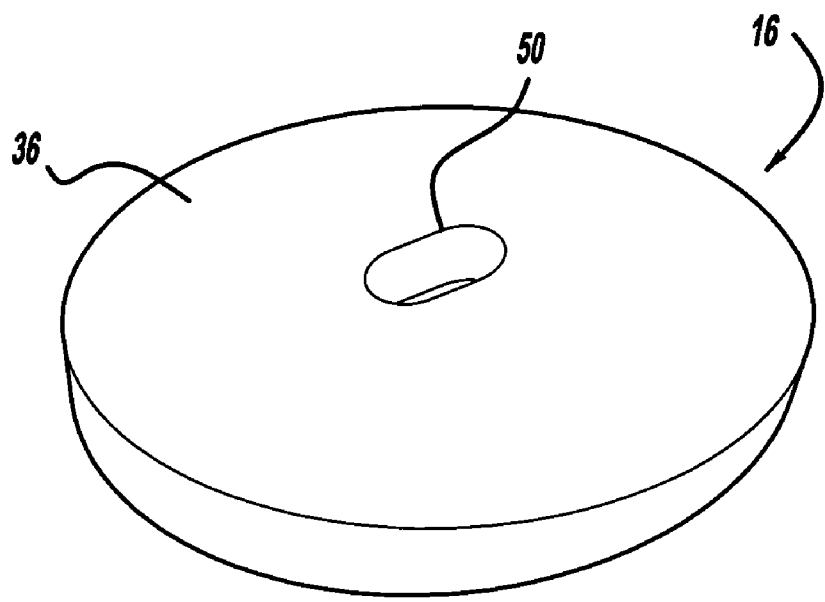
FIG. 5 is another example of a perspective view of a piezoelectric ceramic disc with a $B_{12}$ mode traveling flexure wave produced by the shear-shear vibration mode of the piezoelectric ceramic disc under two phase voltages and free boundary condition with phase difference of $\pi/2$, according to the present invention.

Referring to FIG. 5, another example of a ceramic disc 16 with the traveling flexure wave is illustrated for the $B_{12}$ mode produced by the shear-shear mode of the piezoelectric ceramic disc under two phase voltages with a phase difference of $\pi/2$. This traveling flexure wave may also be modeled using the FEA. The mode rotation in the $B_{02}$ and $B_{12}$ modes may follow the sequences: a-b-c . . . -l-a.

Figure 6:
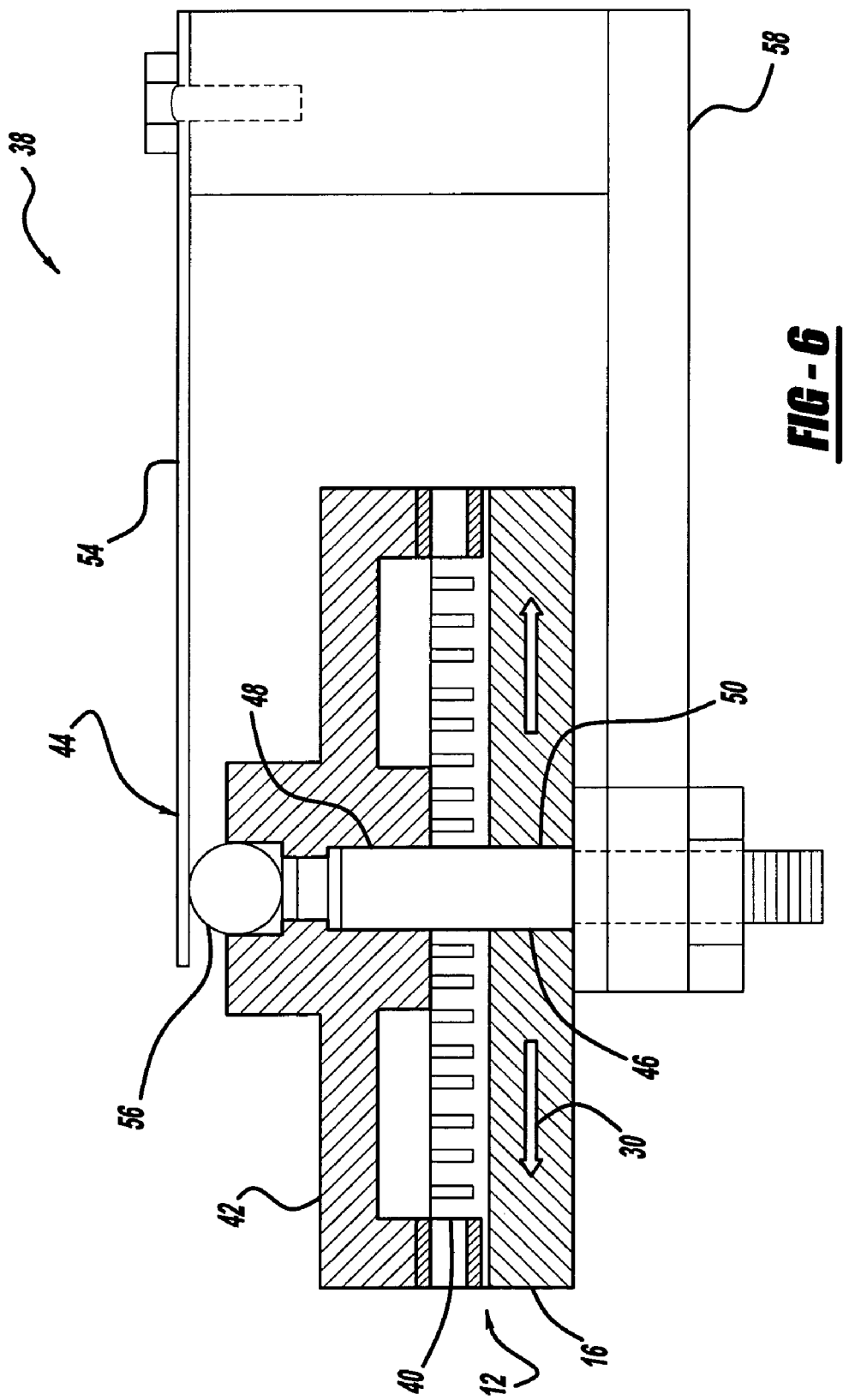
FIG. 6 is a cross-sectional view of the shear-shear $B_{02}$ mode piezoelectric motor, according to the present invention.

Referring to FIG. 6, a piezoelectric shear-shear mode motor using the $B_{02}$ mode produced by the shear-shear mode of the piezoelectric disc under two phase voltages with a phase difference of $\pi/2$ is illustrated at 38. It should be appreciated that like features have like reference numbers. The motor 38 includes a piezoelectric ceramic disc-type stator 12, as previously described. The stator 12 includes a ring containing a plurality of teeth 40 bonded onto the piezoelectric disc 16. Preferably, the teeth ring 40 is a thin metal material, such as stainless steel or the like. The teeth ring 40 serves as an amplifier for amplifying the flexure vibration of the piezoelectric disc 16.

The shear-shear motor 38 also includes a rotor 42 operatively positioned with respect to the stator 12, and a pressing mechanism 44 for positioning the rotor with respect to the stator. In this example, the pressing mechanism is a lever arm 54 and ball 56. The motor 38 also includes a shaft 46 extending through a centrally located aperture 48, 50 in each the rotor 42 and the stator 12. The shaft 46 is secured to the piezoelectric ceramic disc stator 12 using an adhesive, such as epoxy resin or the like. The stator 12 is preferably secured to the motor by a holding means 58, as is known in the art.

The piezoelectric disc 16 includes a top electrode 20 as previously described, which serves as a common electrode, and a bottom electrode 22 which is divided into four segments 24 for two pairs of applied ac voltage input 26. The rotor 42 is held elastically in contact with the teeth ring 40 for the rotational driving thereof by the traveling wave produced on the stator 12. For example, the lever arm 54 and ball 56 may be utilized to pre-load the rotor 42 against the stator 12.

When a traveling flexure wave is excited along the circumference direction of the disc, the portion of the rotor 42 that is in contact with the stator 12 is driven to rotate through the frictional force between the rotor 42 and the stator 12. By changing the phase difference of two inputted voltage pairs from 90 degrees to −90 degrees, the rotational direction of the motor changes in a corresponding manner.

Figure 7:
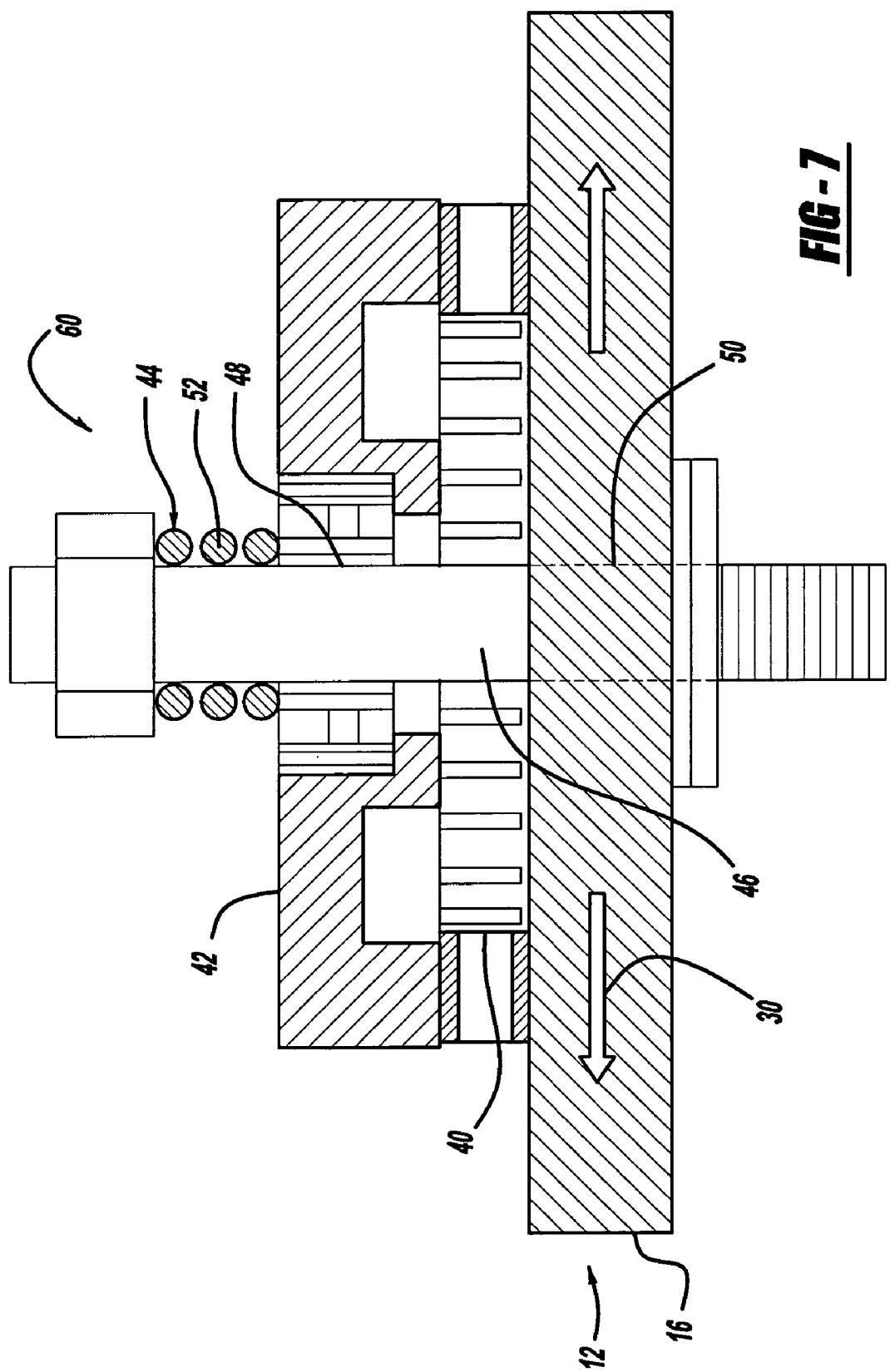
FIG. 7 is another example of a cross-sectional view of the shear-shear $B_{12}$ mode piezoelectric motor, according to the present invention.

Referring to FIG. 7 another example of the shear-shear mode motor using $B_{12}$ mode is illustrated 60. It should be appreciated that like components have like reference numbers. The motor 60 includes a piezoelectric ceramic disc-type stator 12, as previously described. The motor 60 also includes a rotor 42 and a pressing mechanism 44. This motor is distinguishable from the $B_{02}$ mode motor, since the diameter of the metal teeth ring 40 is smaller. The teeth ring is placed on the piezoelectric disc 16 to induce a wave peak for the $B_{12}$ vibration mode. The teeth ring 40 also serves as an amplifier for amplifying flexure vibration of the piezoelectric disc 16. A shaft 46 is fixed in the center of the piezoelectric ceramic disc stator 12 using an adhesive such as an epoxy resin, or the like. In order to obtain a more compact structure, the rotor 42 may be pre-loaded against the stator 12 using a small coil spring 52. The top electrode 20 of the piezoelectric disc 16 is common electrode, and the bottom electrode 22 is divided into four segments for two pairs of ac voltage input, as previously described.

In operation, when a traveling flexure wave is excited along the circumference direction of the disc 16, the portion of the rotor 42 that is in contact with the stator 12 is driven to rotate through the friction force between the rotor 42 and the stator 12. By changing the phase difference of the two input voltage pairs from 90 degrees to −90 degrees, the rotational direction of the motor 60 may be changed.

It should be appreciated that other work modes, such as $B_{03}$, $B_{04}$, $B_{05}$, $B_{06}$ . . . $B_{13}$, $B_{14}$, $B_{15}$, $B_{16}$ . . . , are also possible for the shear-shear mode traveling wave motor. These other work modes may require a corresponding redesign of the electrode configuration of the piezoelectric ceramic disc 16.

In an alterative embodiment shown in FIGS. 8–10, the motor is a shear-shear mode linear motor 70. In this example, the stator 72 includes a rectangular piezoelectric ceramic plate 74 having a polarization in the longitudinal direction as shown at 76. It should be appreciated that the ceramic plate may have an alternative polarization as shown in FIG. 10 at 76a. The motor also includes a rectangular metal plate or slider 86 operatively connected to the stator 72. If an alternating current electrical field is applied in the thickness direction as shown at 80, the thickness shear mode vibration will be excited. A shear mode vibration coupled with an orthogonal mode is excited and a linear motion is obtained in the longitudinal direction by the resulting traveling wave produced by the piezoelectric ceramics. Experimental results demonstrate that the points on the surface of the plate generate elliptic motions. The linear piezoelectric motor 70 is thus obtained using the thickness shear mode vibration.

Referring to Table 8, an example of different resonance frequencies and vibrations for the piezoelectric plate are illustrated at 82. An analytical technique, such as FEA, may be utilized to determine the resonant frequencies of the shear-linear mode piezoelectric vibration. In this example, the dimensions of the piezoelectric plate 74 are approximately 12 mm in length, 5 mm in width and 1 mm in thickness. The vibration mode at 507.07 kHz corresponds to the thickness shear mode (which is a shear mode coupled with an orthogonal thickness vibration mode). It is contemplated that the resonance frequency of the thickness shear mode is dependent on the ratio of length and thickness of the plate, and is independent of width.

Referring back to FIG. 9(a), the shear linear mode motor 70 includes only one piezoelectric ceramic plate bounded by a first electrode 88 and a second electrode 90. Preferably, the second electrode 90 is divided into segments, as shown at 92. The first electrode serves as a ground. The motor 70 also includes a tooth-like plate 84, similar to the previously described tooth ring disposed between the stator 72 and the slider 86. The tooth plate 84 is made of a metal material, such as brass. The piezoelectric materials are hard piezoelectric ceramics, such as that manufactured and sold under the name APC841 from APC Company, as previously described. The rectangular piezoelectric plate 74 is polarized in the longitudinal direction 76.

Referring to FIG. 9(b), a top view of the tooth plate 84 structure is illustrated in more detail. The tooth plate 84 is utilized to amplify the displacement of the wave on the surface of the ceramic plate 74. The application of the applied current causes the motor to easily move the rectangular plate 74 in a forward direction.

Figure 11:
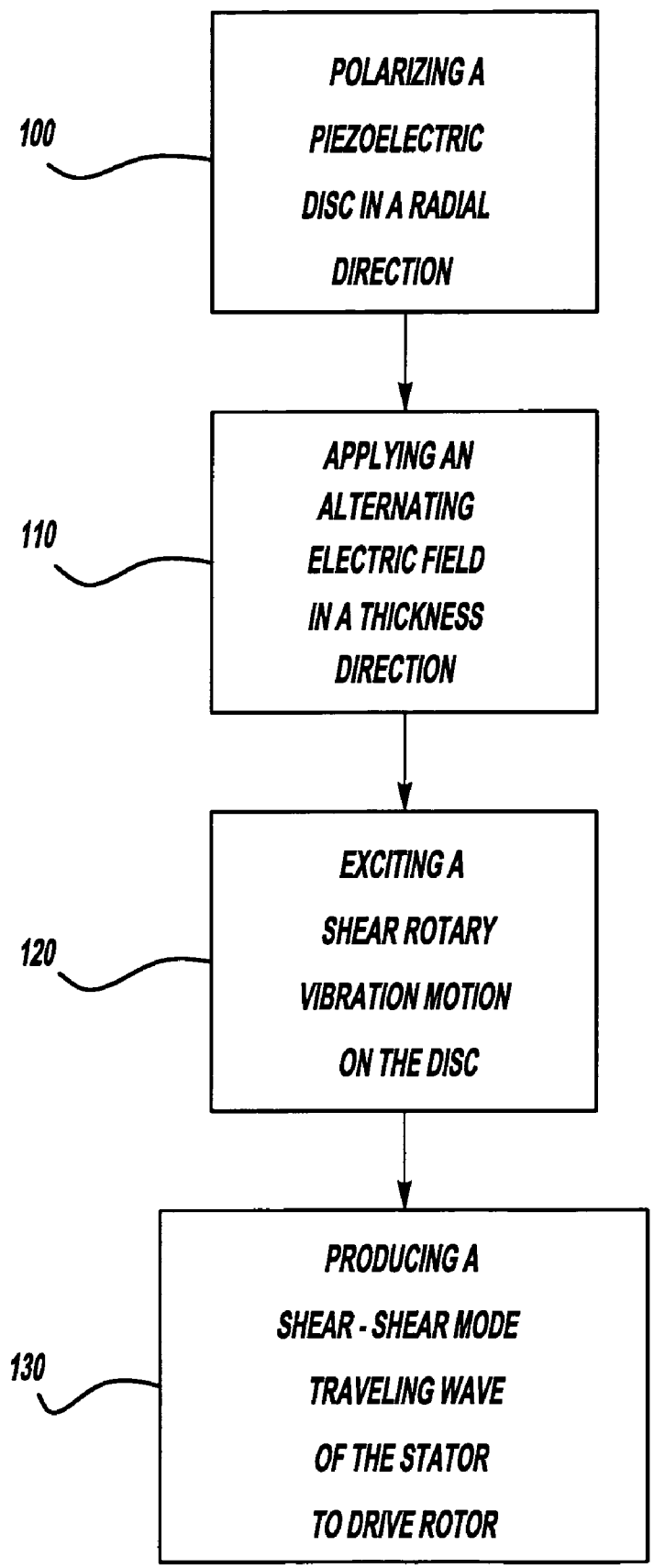
FIG. 11 is a flowchart illustrating a method of exciting a flexure traveling wave using a shear-shear mode to drive the rotor in a rotary direction, according to the present invention.

Referring to FIG. 11, a method of exciting a shear-shear mode vibration in the piezoelectric ceramic disc 16 for the previously described rotary ultrasonic motor 10 is illustrated. The method begins in block 100 with the step of polarizing the piezoelectric disc in a radial direction. An example of a disc polarized in the radial direction is shown in FIGS. 1b, 6 and 7.

The method advances to step 110, and an electric field 26, such as a voltage, is applied to the piezoelectric disc 16, and in particular the bottom electrode, in a thickness direction. The voltage is preferably applied as a pair of alternating voltages with a phase shift of 90 degrees to the segments, as previously described. An example of a voltage is 50 volts. The method advances to block 120.

In block 120, a shear rotary vibration motion is excited on the disc, as a result of the applied voltage. It should be appreciated that the use of the piezoelectric ceramic material's piezoelectric effect and electromechanical coupling effect is maximized through the selection of the shear vibration mode. For example, the $d_{15}$ and $k_{15}$ effects of shear mode in piezoelectric ceramic materials are about three times that of the $d_{31}$ and two times of $k_{31}$ effects, respectively. FIG. 2 shows a comparison of the piezoelectric constants and electromechanical coupling constants.

The method advances to block 130.

In block 130, a flexure vibration shear-shear traveling wave produced along the circumferential direction of the disc results in a deformation of the surface of the stator 12. The portion of the rotor in contact with the stator is driven to rotate through the frictional force between the rotor and the stator. The shear rotary motor advantageously has characteristics of lower driving current, thus, higher energy converting efficiency and higher generative torque than those in the conventional flexure $k_{31}$ type motor with a similar size/configuration.

Figure 12:
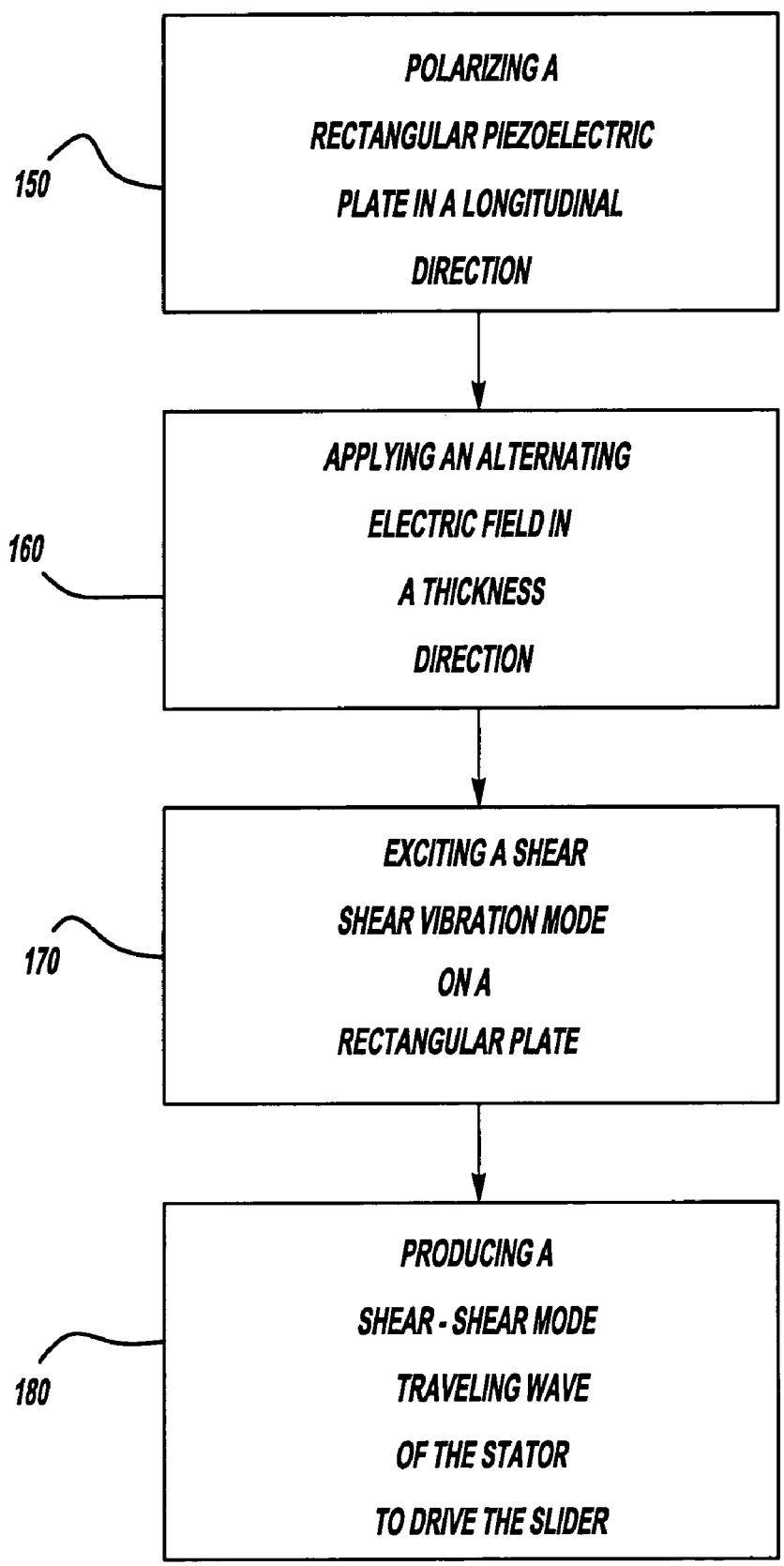
FIG. 12 is a flowchart illustrating a method of exciting a flexure traveling wave using a linear shear-shear mode to drive the slider in a linear direction, according to the present invention.

Referring to FIG. 12, a method of exciting a shear-shear mode vibration in the piezoelectric ceramic plate 74 for the linear ultrasonic motor 70, as previously described with respect to FIGS. 8–10. The method begins in block 150 with the step of polarizing the piezoelectric plate 74 in a longitudinal direction 76, or an alternatively longitudinal direction 76a. An example of a ceramic plate 74 polarized in the longitudinal direction is shown in FIGS. 9a, and 10.

The method advances to step 160, and an electric field 78, such as a voltage, is applied to the piezoelectric rectangular plate 74, and in particular the bottom electrode, in a thickness direction. The voltage is preferably applied as a pair of alternating voltages with a phase shift of 90 degrees to the segments, as previously described. An example of a voltage is 55 Vrms. The tooth plate 84 advantageously amplifies the applied voltage. The method advances to block 170.

In block 170, a linear shear-shear vibration motion is excited on the piezoelectric ceramic plate 74, as a result of the applied voltage. The method advances to block 180.

In block 180, a flexure vibration shear-shear traveling wave produced along the length direction of the rectangular plate results in a deformation of the surface of the stator 12. The rectangular plate 74 moves in a linear direction, resulting in the corresponding motion of the slider for the linear motor 70.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A rotary ultrasonic piezoelectric motor comprising:
a stator having a piezoelectric ceramic disc polarized in the radial direction, and bounded by a top electrode positioned on an upper side of said ceramic disc and a bottom electrode positioned on a lower side of said ceramic disc, and the bottom electrode is divided into segments;
a power source, wherein said power source applies two pairs of alternating voltages to said bottom electrode segments to excite a shear mode vibration in said stator, resulting in a shear-shear mode flexure traveling wave in said stator; and
a rotor operatively connected to said stator, wherein a portion of said rotor in contact with said stator is driven to rotate through a frictional force between said rotor and said stator due to said traveling wave deformation of said stator.

2. The rotary motor as set forth in claim 1 further comprising a metal ring having a plurality of teeth disposed on said ceramic disc.

3. The motor as set forth in claim 1 wherein said bottom electrode is divided into an even number of segments.

4. The rotary motor as set forth in claim 1 wherein said stator and said rotor are each supported on a shaft extending through a centrally located aperture in said rotor and a centrally located aperture in said stator.

5. The rotary motor as set forth in claim 4 further comprising a holding means for supporting said stator.

6. The rotary motor as set forth in claim 5 further comprising a pressing means for preloading said stator against said rotor.

7. The rotary motor as set forth in claim 6 wherein said pressing means is a spring.

8. The rotary motor as set forth in claim 1 wherein said piezoelectric disc is operated at a flexure resonance mode of $B_{02}$.

9. The rotary motor as set forth in claim 1 wherein said piezoelectric disc is operated at a flexure resonance mode of $B_{12}$.

10. The rotary motor as set forth in claim 1 wherein a phase difference of said applied voltage is changed from 90 degrees to −90 degrees to change the rotational direction of said rotor.

11. A method of exciting a shear-shear mode vibration in a piezoelectric ceramic disc for a rotary ultrasonic piezoelectric motor having a rotor and a stator, said method comprising the steps of:
polarizing the piezoelectric disc for the stator in a radial direction, wherein the piezoelectric ceramic disc is bounded by a top electrode positioned on an upper side of the ceramic disc, and a bottom electrode positioned on a lower side of the ceramic disc, and the bottom electrode is divided into segments;
applying a pair of alternating voltages with a phase shift of 90 degrees to the bottom electrode segments from a power source;
exciting a shear-shear mode vibration in the stator; and
producing a shear-shear mode flexure traveling wave in the stator causing a portion of the rotor in contact with the stator to rotate through a frictional force between the rotor and the stator due to the traveling wave deformation of the stator.

12. A method as set forth in claim 11 further comprising the step of changing a phase difference of the applied voltage from 90 degrees to −90 degrees to change the rotary motion of the rotor.

13. A rotary ultrasonic piezoelectric motor comprising:
a stator having a piezoelectric ceramic disc polarized in the radial direction, and bounded by a top electrode positioned on an upper side of said ceramic disc and a bottom electrode positioned on a lower side of said ceramic disc, and the bottom electrode is divided into segments;
a metal ring having a plurality of teeth disposed on said ceramic disc;
a power source, wherein said power source applies two pairs of alternating voltages to said bottom electrode segments to excite a shear mode vibration in said stator, resulting in a shear-shear mode flexure traveling wave in said stator; and
a rotor operatively connected to said stator, wherein a portion of said rotor in contact with said stator is driven to rotate through a frictional force between said rotor and said stator due to said traveling wave deformation of said stator, and said stator and said rotor are each supported on a shaft extending through a centrally located aperture in said rotor and a centrally located aperture in said stator.

14. The rotary motor as set forth in claim 13 further comprising a holding means for supporting said stator.

15. The rotary motor as set forth in claim 14 further comprising a pressing means for preloading said stator against said rotor.

16. The rotary motor as set forth in claim 15 wherein said pressing means is a spring.

17. The rotary motor as set forth in claim 13 wherein said piezoelectric disc is operated at a flexure resonance mode of $B_{02}$.

18. The rotary motor as set forth in claim 13 wherein said piezoelectric disc is operated at a flexure resonance mode of $B_{12}$.

* * * * *

UNITED STATES PATENT AND TRADEMARK OFFICE
CERTIFICATE OF CORRECTION

PATENT NO. : 7,095,160 B2
APPLICATION NO. : 10/855260
DATED : August 22, 2006
INVENTOR(S) : Kenji Uchino Page 1 of 1

It is certified that error appears in the above-identified patent and that said Letters Patent is hereby corrected as shown below:

Column 1, line 4 insert the following:

STATEMENT REGARDING FEDERALLY SPONSORED
RESEARCH OR DEVELOPMENT

This invention was made with Government support under Grant No. R43 RR015339 awarded by the National Institutes of Health. The U.S. Government has certain rights in the invention.

Signed and Sealed this

Twenty-eighth Day of October, 2008

JON W. DUDAS
*Director of the United States Patent and Trademark Office*